(12) United States Patent
Garay et al.

(10) Patent No.: US 6,183,099 B1
(45) Date of Patent: Feb. 6, 2001

(54) LIGHT GUIDE FOR ILLUMINATING A DIAL

(75) Inventors: John L. Garay, Southbury; Richard D. Ciervo, New Britain; William M Kurple, Middlebury, all of CT (US)

(73) Assignee: Timex Corporation, Middlebury, CT (US)

( * ) Notice: Under 35 U.S.C. 154(b), the term of this patent shall be extended for 0 days.

(21) Appl. No.: 09/328,513

(22) Filed: Jun. 9, 1999

(51) Int. Cl.[7] .................................................. G01D 11/28
(52) U.S. Cl. ............................. 362/26; 362/23; 362/29; 362/31
(58) Field of Search ......................... 362/23–29, 551, 362/555, 558, 559, 67, 220, 227, 31; 118/280, 310

(56) References Cited

U.S. PATENT DOCUMENTS

| | | | |
|---|---|---|---|
| 2,140,972 | 12/1938 | Rylsky | 362/26 |
| 2,188,821 | 1/1940 | Rylsky | 362/30 |
| 2,480,393 | 8/1949 | Bossert et al. | 362/558 |
| 3,043,038 | 7/1962 | Marble | 40/546 |
| 3,043,947 | * 7/1962 | Albinger, Jr. | 362/31 |
| 3,561,145 | 2/1971 | Shotwell | 40/546 |
| 3,748,456 | 7/1973 | Brien | 362/26 |
| 3,859,782 | * 1/1975 | Kitai | 58/50 |
| 4,026,103 | 5/1977 | Ichikawa et al. | 368/67 |
| 4,323,951 | 4/1982 | Pasco | 362/27 |
| 4,771,368 | 9/1988 | Tsukamoto et al. | 362/29 |
| 5,239,450 | * 8/1993 | Wall | 362/104 |
| 5,390,085 | * 2/1995 | Mari-Roca et al. | 362/31 |
| 5,546,888 | * 8/1996 | Skiver et al. | 116/286 |
| 5,639,158 | 6/1997 | Sato | 362/247 |
| 5,667,289 | 9/1997 | Akahane et al. | 362/31 |
| 5,926,033 | * 7/1999 | Saigo et al. | 362/31 |

* cited by examiner

*Primary Examiner*—Sandra O'Shea
*Assistant Examiner*—Ismael Negron
(74) *Attorney, Agent, or Firm*—Carmody & Torrance LLP

(57) ABSTRACT

A lightguide for illuminating a dial of a timekeeping device having a flat portion having a bottom surface and an upper surface in facing alignment with the watch dial, a lightpipe integrally formed with and extending below the flat portion, the lightpipe having a foot region at one end thereof, and geometries molded into the bottom surface of the flat portion to selectively eject internally reflected light from the bottom surface of the flat portion through the upper surface, where the lightguide provides illumination to the dial when a concentrated light source disposed below and spaced apart from the foot region conducts light to the lightpipe.

8 Claims, 5 Drawing Sheets

LIGHT GUIDE FOR ILLUMINATING A DIAL

BACKGROUND OF THE INVENTION

This invention relates generally to illumination arrangements for instrument dials and more particularly to an improved illumination system for a wristwatch dial.

It is known to provide instruments such as wristwatches with a light source for illuminating the dial. The wristwatch dial may be an analog wristwatch dial having indicia or markers used in connection with hands of the watch, or the dial may comprise an electro-optic display of actuated indicia, such as a liquid crystal display. One objective in a dial illumination system has been to achieve a constant and uniform lighting for the dial. Uniform background lighting may be achieved by using a distributed uniform light source, such as an electroluminescent light source. However, in order to reduce the cost of an illumination system for a dial, concentrated light sources, such as a single incandescent bulb or a light emitting diode (LED) have also been considered. One problem with using a concentrated light source is to transfer and diffuse the light from a point source of bright light to a uniformly distributed light source for illuminating the dial. The prior art contains many examples of efforts to effect the transformation.

In addition to illumination, light may be used to achieve an aesthetic graphic presentation. In this case it must be possible to locate areas of greater or lesser brightness or different colors at different locations on the dial. Traditional constructions using edge lighting around the outside periphery of a light guide are ineffective in directing the light to the desired location.

Constructions are known for using a light guide behind a light transmissive dial, and to inject light into the light guide. The following U.S. Patents are representative of prior art constructions for illuminating dials from a concentrated light source using a light guide.

| U.S. Pat. No. | INVENTOR | ISSUE DATE | TITLE |
| --- | --- | --- | --- |
| 3,748,456 | Brien | July 24, 1973 | Illuminated Instrument Dials |
| 2,140,972 | Rylsky | Dec. 20, 1938 | Means far Illuminating Dials of Instruments |
| 2,188,821 | Rylsky | Jan. 30, 1940 | Compass |
| 2,480,393 | Bossert et al. | Aug. 30, 1949 | Dial Light |
| 3,043,038 | Marble | July 10, 1962 | Illuminated Dial Face |
| 3,561,145 | Shotwell | Feb. 9, 1971 | Light Distributing Lens System |

The aforementioned Marble U.S. Pat. No. 3,043,038 and Shotwell U.S. Pat. No. 3,561,145 employ light guides bounded is by substantially planar surfaces and attempt to distribute the light rays which are undergoing multiple internal reflections which are introduced from a concentrated source at the peripheral edge of the light guide. Such a construction is deficient for several reasons. For example, in the '038 patent identified above, the light entering the lens must do so at an edge and therefore, the distribution of light along the entire lens surface is less than uniform. Secondly, and as conceded in the '038 patent, there is a tremendously non-uniform illumination in the lens nearest the lamp. Hence, the '038 patent employs an opaque member that causes less than the entire dial surface to illuminate. Although this is considered by the '038 patent to be a "novel effect," it is clear that it is less than desirable in a watch where it is desirable to illuminate the entire dial. Lastly positioning the lamp adjacent the lens is permissible in a device where space is not a priority. In watches, space is a valuable commodity that must be considered at all times.

U.S. Pat. No. 5,667,289 issued Sep. 16, 1997 to Akahane et al. describes a background lighting apparatus for a liquid crystal display, in which a nonuniform pattern of light dispersing reflective layers are applied to a light guide illuminated from the edges of the light guide. The reflective layers are arranged to increase in size as the distance from the lighted edge become greater.

It is particularly difficult to effectively and uniformly conduct light from a concentrated source to a light guide in a wristwatch disposed beneath the watch dial. Space is at a premium and the previously known constructions have not been satisfactory.

Accordingly, an improved illumination arrangement for a watch dial that overcomes the drawbacks found in the prior art while at the same time provides for a desirable and uniform distribution of illumination, is desired.

SUMMARY OF THE INVENTION

Generally speaking, in accordance with the present invention, a lightguide for illuminating a dial in a timekeeping device, such as a watch, is provided. The lightguide preferably includes an at least essentially flat portion having a bottom surface and an upper surface in facing alignment with the dial, a lightpipe integrally formed with and extending below the flat portion, the lightpipe having a foot region at one end thereof, and geometries molded into the bottom surface of the flat portion to selectively eject internally reflected light from the bottom surface of the flat portion through the upper surface, wherein the lightguide provides illumination to the dial when a concentrated light source disposed below and spaced apart from the foot region conducts light to the lightpipe. In a preferred construction, the foot region has a concave surface for channeling light to the flat portion. Furthermore, the lightpipe forms, with the flat surface, a cavity, and a conical light deflector may be disposed in the cavity to reduce the visible intensity of light emanating from the concentrated light source and conducted through the lightpipe. The edges of the lightguide may also be painted to further reduce light from exiting the edges of the lightguide. The timekeeping device may be a watch such as a wristworn watch, a stopwatch, or a pocketwatch or even a clock. In a preferred embodiment the illumination is uniform although differing illumination patterns could be created as disclosed and discussed herein.

The invention is also directed to an illumination arrangement for a timekeeping device, such a wristworn watch, stopwatch, pocketwatch or clock, and preferably comprises a lightguide as disclosed above, a dial to be illuminated disposed above the lightguide, the dial comprising a light transmissive member having a periphery substantially coextensive with that of the lightguide and having a bottom surface in facing alignment with the upper surface of the lightguide, and a concentrated light source disposed below and spaced apart from the foot region of the lightguide, wherein the lightguide provides at least essentially uniform illumination to the dial when the concentrated light source conducts light to the lightpipe. In the preferred embodiment, the concentrated light source is at least one light emitting diode, the molded geometries increase in size as the distance from the lightpipe increases and the dial may include an absorption pattern on the bottom surface thereof to reduce the visible intensity of light emanating from the concentrated light source.

Accordingly, it is an object of the present invention to achieve a desired illumination of light for a dial for a timekeeping device.

It is also an object of the present invention to achieve a uniform distribution of light using a concentrated or point light source and conducting the light to a lightguide for illuminating a dial.

Another object of the present invention is to construct a timepiece with an illumination arrangement that is relatively easy to manufacture.

Another object of the present invention is to construct a lightguide for use in the timepiece, such as a watch, that accommodates manufacturing tolerances existing among the other timepiece components.

Still another object of the present invention is to construct an improved illumination arrangement that includes features that more effectively directs the light and reduces or eliminates any "hot-spots" existing above the concentrated light source.

Yet another object of the present invention is to systematically mold geometries within the bottom surface of the lightguide to assist in creating a uniform distribution of illumination of the watch dial.

Still yet another object of the present invention is to construct a timepiece with an illuminating arrangement that is more efficient than prior technologies yet can be realized at a significantly reduced cost.

Still yet another object of the present invention is illuminate a watch dial with varying colors.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
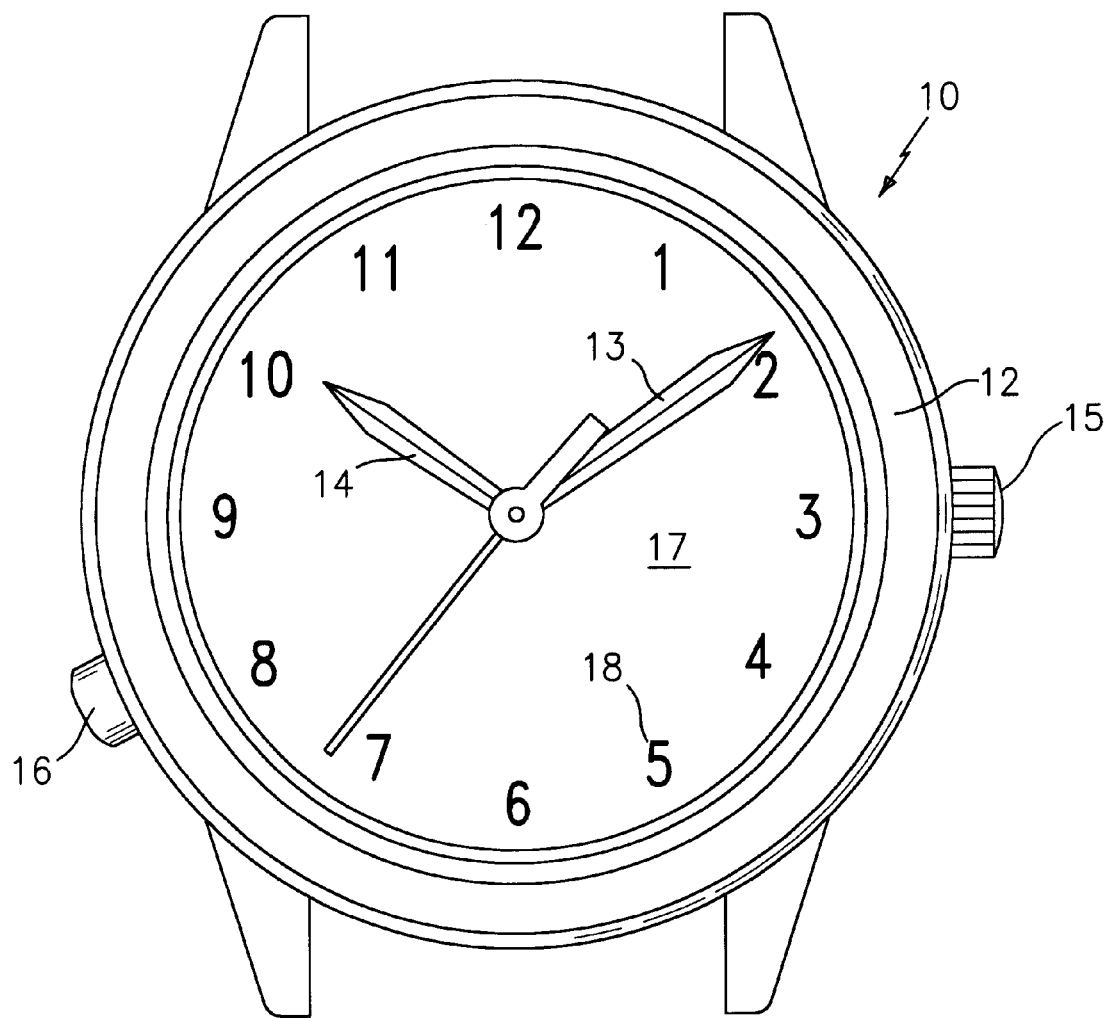
FIG. 1 is a plan view of an analog watch with an illuminated dial.

FIG. 1 illustrates a timepiece 10, preferably a watch, such as, but not limited to a wristwatch, with a conventional case 12, minute hand 13 and hour hand 14 mounted on rotatable stems and driven by a conventional movement, the details of which are not material to the present invention. A crown 15 is used to set the position of the minute hand 13 and hour hand 14, while a push button actuator 16 may be included to actuate switch contacts (not shown) inside the case of the watch. Below the hands is a dial 17 having time-indicating indicia thereon, such as hour numerals 18. The dial 17 is constructed of light transmissive material such as glass or Mylar.

Figure 2:
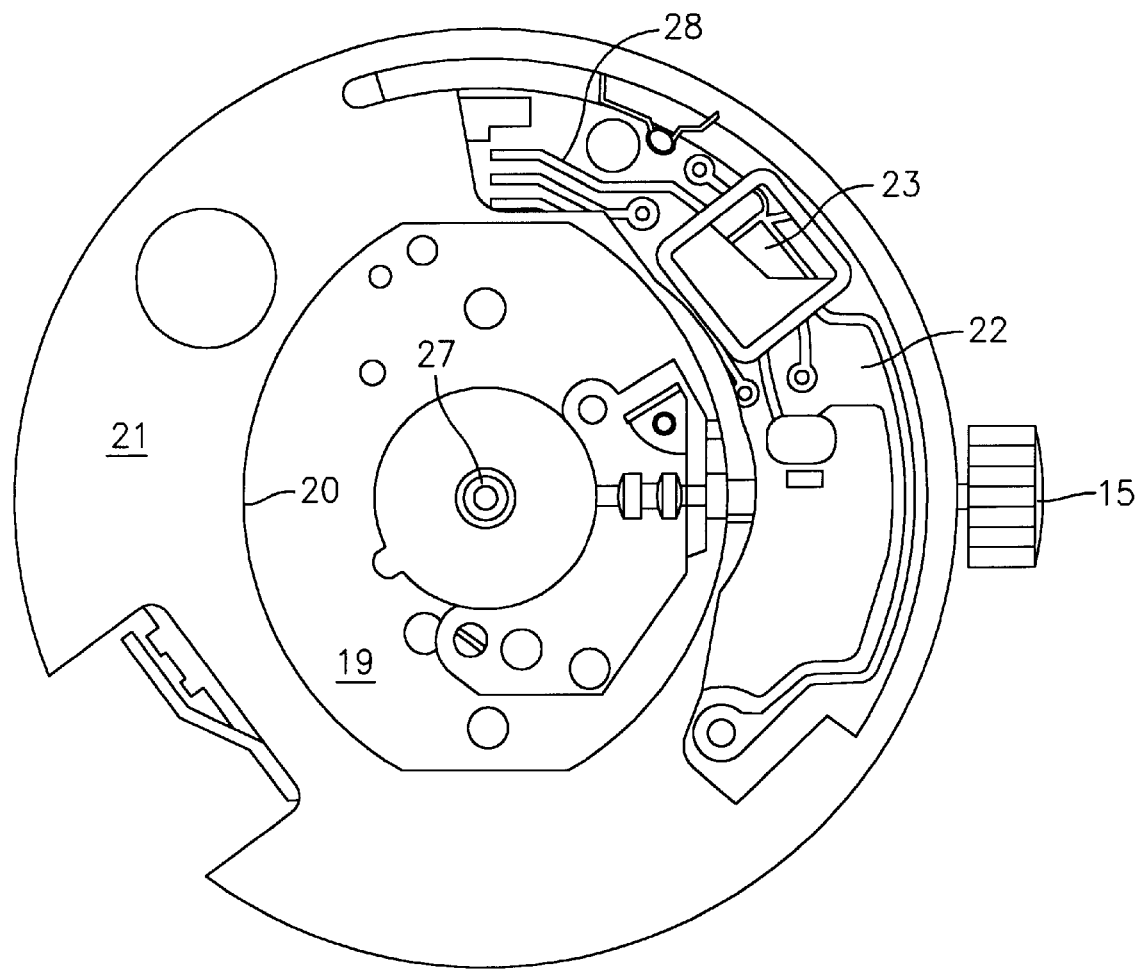
FIG. 2 is a plan view of the watch frame and movement, removed from the case, with portions of the frame broken away to show the printed circuit board.

FIG. 2 shows a plan view of the frame and movement removed from case 12, and also omitting hands 13, 14 and dial 17 in order to see the details of the assembly beneath. A conventional timepiece movement assembly 19 is housed within a correspondingly shaped aperture 20 in a frame 21 of insulating material. Movement assembly 19 includes a conventional quartz analog stepping motor driving a gear train to turn one or more rotatable stems 27 adapted to receive the minute hand 13 and the hourhand 14. Disposed on the underside of frame 21 is a printed circuit board 22 containing electrical circuitry for operating the stepping motor and also for causing illumination of the dial. A portion of the frame 21 is cut away in the drawing to reveal part of printed circuit board 22. Disposed on printed circuit board 22 is a first integrated circuit (not shown) for operating a stepping motor, and a second circuit 23 for operating a light emitting diode (LED) by means of conductive leads 28 on printed circuit board 22. The LED, not shown in FIG. 2 but discussed at length with respect to FIGS. 3–7, may be mounted permanently to the PC board in a manner discussed below.

Figure 3:
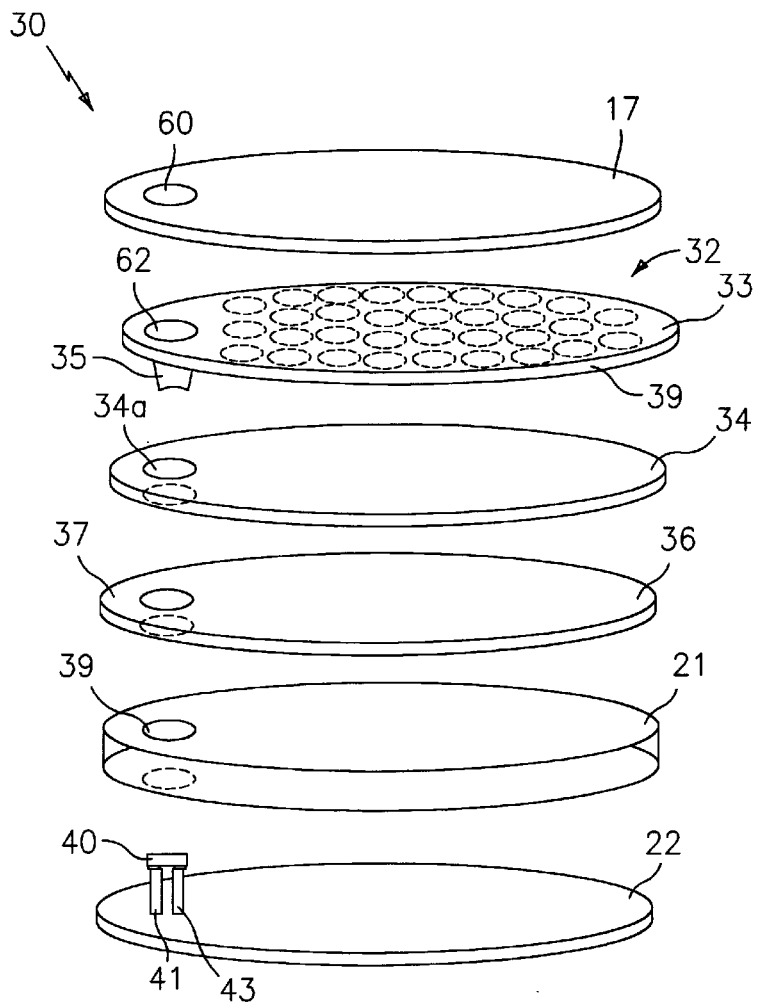
FIG. 3 is an exploded view of an illumination arrangement constructed in accordance with the present invention.

Reference is now made to FIG. 3 which depicts in greater detail the overall preferred construction of the present invention, and the illumination arrangement in particular.

Generally speaking, illumination arrangement 30 includes dial 17, positioned atop a lightguide 32, which itself is positioned atop an optional paper layer 34 or other suitable material, such as white Mylar. Dial 17 preferably has a periphery substantially coextensive with that of lightguide 32. Lightguide 32 includes an essentially flat surface portion 33 and a lightpipe 35 integrally formed therewith, details of which are further discussed below. In the preferred embodiment, paper layer 34 is a sheet of white paper. Paper layer 34 further assists in diffusing the light evenly about lightguide 32. Below paper layer 34 is a holding plate 36, preferably made from stainless steel. In place of paper layer 34, if desired, holding plate 36 may be appropriately coated. Holding plate 36 is positioned above frame 21 which itself is positioned above printed circuit board 22. Holding plate 36 secures movement assembly 19 to frame 21 and board 22, while frame 21 houses movement assembly 19. Secured in a known manner to board 22 is a power source for the watch movement and illumination arrangement, preferably comprising a lithium cell, although other power sources could be used as long as voltages capable of driving the below-described LED can be established.

Frame 21 includes an aperture 39 dimensioned to receive therethrough an LED 40, while holding plate 36 includes an aperture 37 dimensioned to receive therethrough at least a portion of lightpipe 35, thereby permitting the close proximity between LED 40 and lightpipe 35. Similarly, paper layer 34 includes a likewise aligned aperture 34a for receiving therethrough a portion of lightpipe 35.

Figure 4:
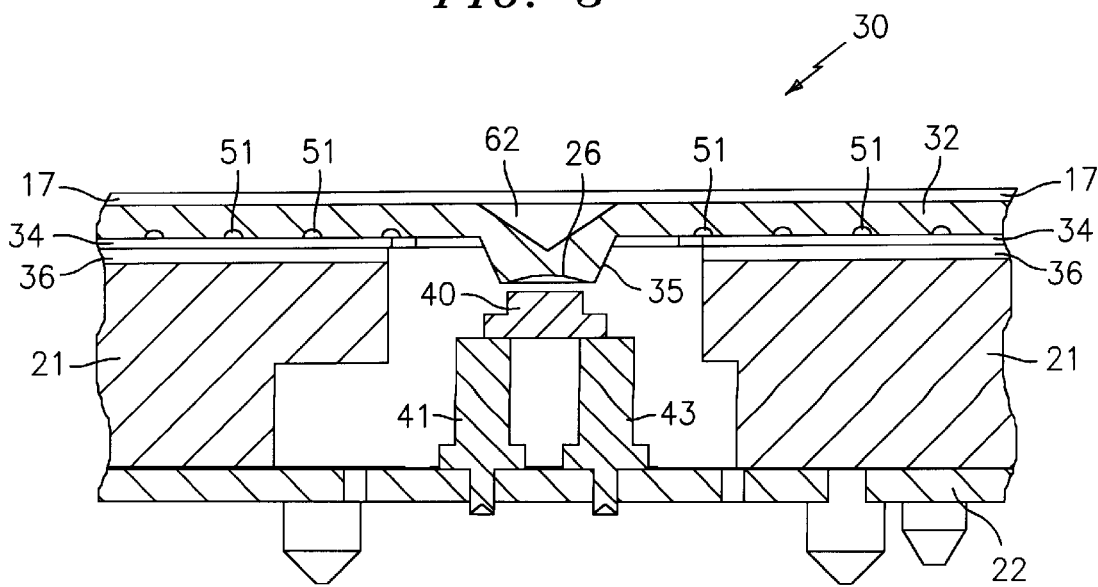
FIG. 4 is a cross-sectional view of the illumination arrangement having been constructed in accordance with the present invention.

Referring also to FIG. 4 in combination with FIG. 3, LED 40 can be seen to be positioned beneath lightpipe 35 of lightguide 32. LED 40 may be any one of a number of conventional LED's and in the preferred embodiment, is a Hewlett Packard HSMX-S660/670/690 Series LED or a Stanley NOVA BRIGHT (AlInGaP) Surface Mount LED both of which are preferred light emitting diodes useful in the practice of this invention. LED 40 is preferably mounted on a pair of extension posts 41, 43 (which themselves are mounted on board 22) so as to be brought into alignment under and in close proximity with a foot region 26 of lightpipe 35. Posts 41, 43 could also be eliminated or modified if a custom LED is used. Foot region 26 has a concave surface for, among other things, advantageously permitting for slight differences in component tolerances and allowing the close proximate spacing required between LED 40 and lightpipe 35.

Figure 5:
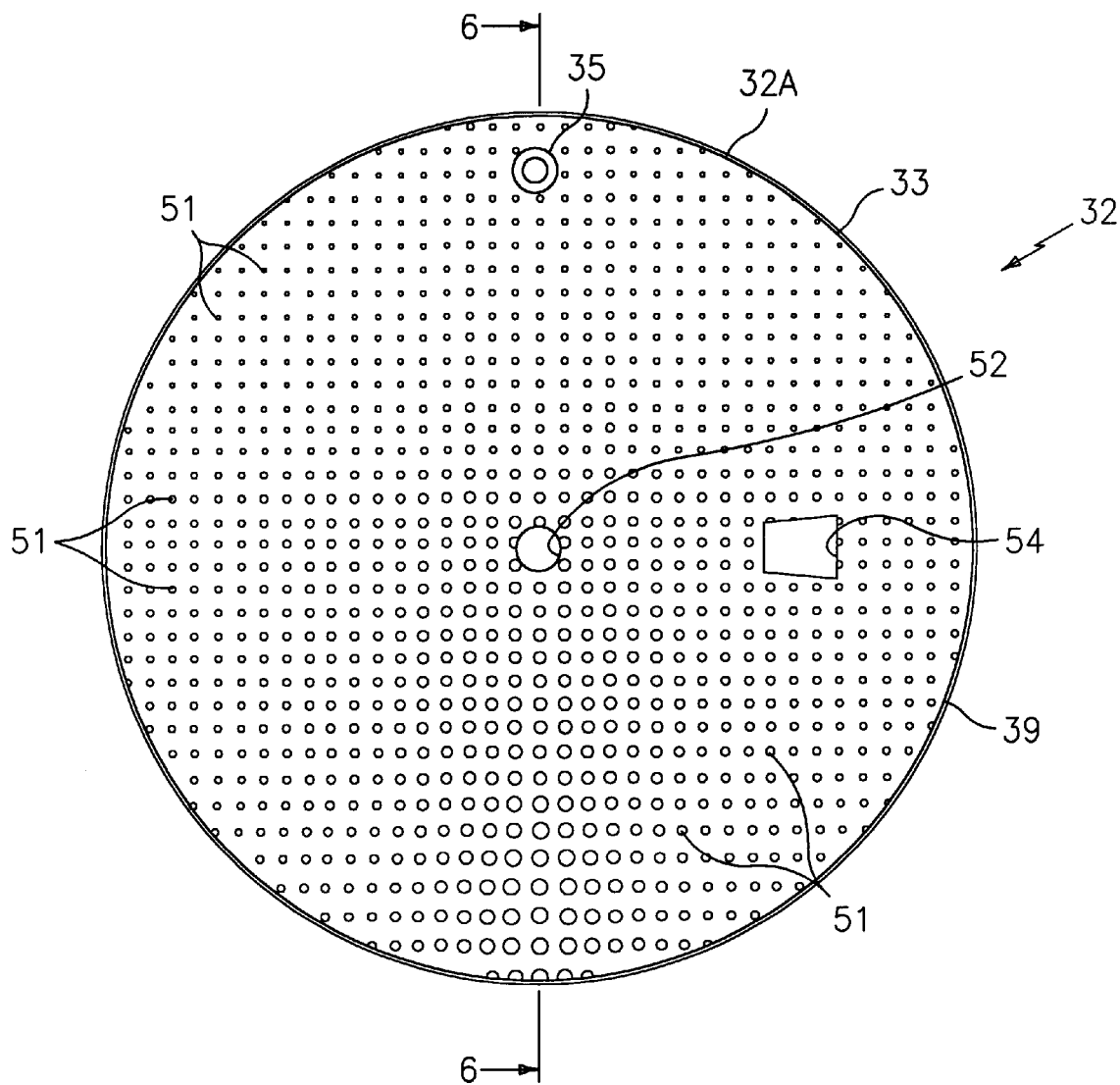
FIG. 5 is a top plan view of a lightguide constructed in accordance with the present invention.
Figure 6:
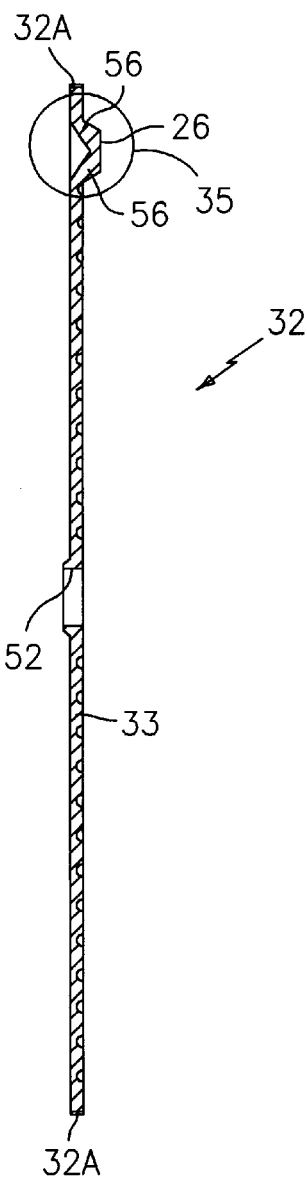
FIG. 6 is a sectional view of the lightguide depicted in FIG. 5 taken about lines 6—6.
Figure 7:
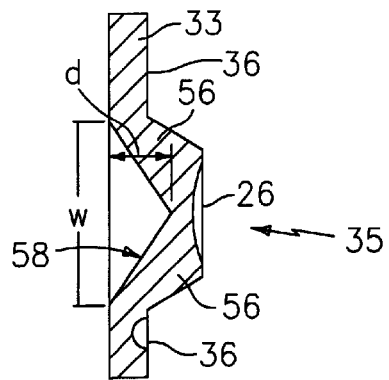
FIG. 7 is an enlarged view of a portion of the lightguide depicted in FIG. 6.

Reference is now made to FIGS. 5–7 for a more detailed discussion of lightguide 32, constructed in accordance with the present invention. Lightguide 32 is constructed from acrylic although other materials such as polycarbonate lexan may be used.

As the present example illustrates an analog timepiece, a center aperture 52 is provided for receiving the post on which hands 13, 14 of timepiece 10 are mounted. A second aperture 54 may be provided for displaying the day or date, as would be understood in the art.

Lightguide 32 includes a plurality of concave dimpled surfaces 51 (geometries) therewithin. It is noted that only a few of them have been identified with a reference numeral. Each dimpled surface 51 is preferably formed on the bottom surface of lightguide 32. By reference to the "bottom surface", it is intended to mean the surface facing movement assembly 19. The "upper surface" of lightguide 32 is intended to mean the side facing dial 17. The upper surface of lightpipe 35 is illustrated as well in FIG. 4. Moreover, it can be seen that the dimpled surfaces 51 vary in size as the distance from lightpipe 35 increases, the purpose and function of which is discussed in greater detail below.

Attention is now made to FIGS. 6 and 7 in particular, which illustrates lightguide 32 in cross-section and in greater detail. Lightguide 32 includes flat portion 33 and lightpipe 35. Lightpipe 35 is comprised of a conical portion 56 that extends below a bottom surface 36 of flat portion 33 and is integral with flat portion 33. "Below" is intended to mean that lightpipe 35 has a longitudinal axis that is essentially orthoganol with flat portion 33 and does not extend outside the edges 39 of flat portion 33. (See FIG. 5 noting that lightpipe 35 is not visible beyond edges 39). At the distal end of lightpipe 35 is foot region 26, the end surface of which is concave. The construction of lightpipe 35 facilitates the optical coupling between lightguide 32 and LED 40, as well as facilitates the shaping of the light into lightpipe 35 and the channeling of the light through lightguide 32. In the preferred embodiment, the concavity of the surface of foot region 26 is about 1.2 mm in width and about 0.5 mm in depth.

As shown most clearly in FIG. 7, conical lightpipe 35 extends from portion 33 and forms a "v-shaped" cavity 58 in the upper surface of lightguide 32. In the preferred embodiment, the depth (d) of cavity 58 is about 0.6 mm, and the approximate width (w) of cavity 58 is approximately 1.8 mm. The "v-shaped" cavity 58 facilitates the distribution and refraction of light throughout lightguide 32, while at the same time reducing any "hot-spot" that may form on dial 17 directly above LED 40.

As stated above, geometries are molded within lightguide 32 on the bottom surface thereof to facilitate and optimize the distribution of light throughout lightguide 32 and emanating from LED 40. The molding of the preferred geometries within lightguide 32 may be achieved by conventional molding techniques. It will be appreciated that a more even distribution of light can be readily achievable by varying the sizes and spacing of the dimpled surfaces. Specifically, the dimple depth and spacing vary throughout lightguide 32, and, in general, smaller dimples will be nearer lightpipe 35 and the diameter size of the dimples will increase as one moves radially away from lightpipe 35. In this way, the smaller dimples more closely resemble a flat surface and permit more light to pass longitudinally along lightguide 32. It is desirable for a greater percentage of the light nearest LED 40 to propagate away from LED 40 and be "ejected" at the outerlying areas of the lightguide. The larger dimpled surfaces "eject" the dispersed light by reflection, thereby assisting in preventing needed light from escaping to the edges of lightguide 32.

It will also be appreciated that the objective, as light propagates through lightguide 32, is to direct the light upwardly towards the upper surface of lightguide 32. The distance to which the dimple extends into the interior region of lightguide 32 is directly attributable to the amount of light that contacts the surface of the dimpled surfaces and is deflected towards the upper surface of lightguide 32. Conversely, since the smaller dimpled surfaces extend less into the interior region of lightguide 32, the more likely it is that the light rays will pass over the surface of these smaller dimpled region and "escape" out towards the edges of lightguide 32. The sizing and patterning of the dimpled surfaces for a lightguide contemplated by the present invention can be constructed by one of ordinary skill in the art by implementing the computer software programming annexed hereto as Appendix A.

From the foregoing, it will also be appreciated that some of the light will pass towards and reach the edges of lightguide 32. Accordingly, the edges 39 of lightguide 32 may be "roughed-up" by conventional paint scattering techniques or "pitting". The paint layer 32A is shown on FIG.5 this will further hinder the likelihood that light will exit the edges, thereby permitting more light to desirably exit the upper surface of lightguide 32. To still further achieve the desired illumination achievable by the present invention, paper layer 34 may be provided. The addition of a paper layer, and in particular white paper, serves to eliminate some of the shadows due to the multi-layered structure, and also assists in providing a more uniform light distribution throughout lightguide 32. That is, paper layer 34 still further reduces light from exiting the bottom surface of lightguide 32, as it will redirect upwardly any light that is directed towards the bottom surface of the lightguide (by the deflection of the light off the dimpled surfaces, for example). In this way, dial 17 is still further illuminated.

Still further, the presence of LED 40 has been found to initially cause a visible "hot-spot" on the surface of dial 17, above where LED 40 is positioned. That is, the light emanating from lightguide 32 above LED 40 is considerably more intense than the light emitted throughout the remainder of the surface of lightguide 32. This "hot-spot" may therefore cause a visible difference in light distribution uniformity as viewed across portion 33 of lightguide 32. Therefore, to reduce the "hot-spot", it is preferable to include an absorption pattern 60 on the underside of dial 17 facing lightguide 32, it being dimensioned to overly LED 40 and preferably made from paint with low transmissibility.

Alternatively, the pattern 60 could be a separate film with an absorbing material. "V-shaped" cavity 58 in lightguide 32 formed by the lightpipe 35 may still further allow for a reduction in the "hot-spot" by receiving a conical light deflector 62 there within (FIGS. 3 and 4). In the preferred embodiment, conical light deflector 62 is made from highly polished metal such as stainless steel and will lay flush with the upper surface of lightguide 32 so as to evenly receive dial 17. As with pattern 60 and paper layer 34, deflector 62 is optional. Alternatively, a metal deflector (not shown) may be used in place of conical deflector 62 and may be achieved by adding paint within cavity 58.

Operation of the illumination of dial 17 is preferably achieved by activation of a switch, and may be attained by use of switch 16 or crown 15, the adoption therefor being within the purview of one skilled in the art. A microcontroller interface could also be utilized to initiate the illumination. In the preferred embodiment, activation is established when a switch is manually closed. Upon closure of the switch a circuit comprising the aforementioned battery, the LED and a resistor (not shown) in series therewith permits current to flow through the LED. The LED will remain illuminated for the duration of the switch closure. An alternate design may provide for the driving of LED 40 directly from a microcontroller (not shown), wherein the microcontroller would sense switch closure and in turn establish the voltage drive to the LED. Drive options such as duration and light pulses are limited only by software implementation. In both manual and microcontroller operation, it should be noted that intensity of the LED can be controlled by varying the value of the series resistor. A higher value resistor will reduce the LED output, while a lower resistor value will increase the LED output.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

For example, and as stated above, watch 10 incorporating the invention disclosed herein may be constructed as an analog and/or combination analog and digital watch. Additionally, by incorporating either different color LED's or varying the color of the Mylar dial, different and/or multiple colors may be achieved to illuminate the watch dial. Moreover, lightpipe 35 may be formed with the LED as one integrally formed unit. Still further, multiple light sources may be utilized for additional aesthetic effects. In such a case, multiple foot regions as disclosed above could be present.

Still further as the present invention is applicable for a varying number of watch styles and sizes, it should now be well understood that the geometries and patterning thereof in lightguide 32 may be arranged to manage and uniformly correct any shadowing effect that may occur upon a different size or shaped watch dial.

Figure 8:
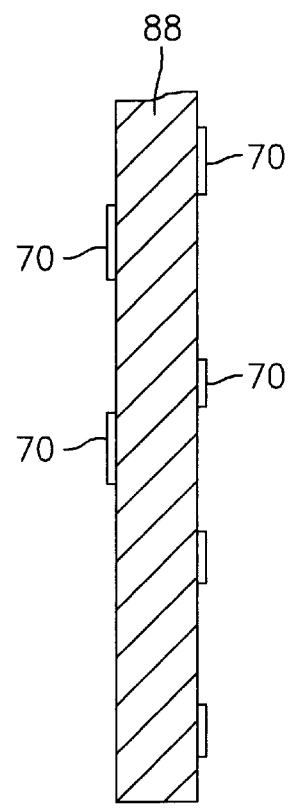
FIG. 8 is a sectional view of a portion of a lightguide having ejection patterns in accordance with another embodiment of the present invention.

Still further, in place of the molded geometries as disclosed above, the present application contemplates the use of other light reflective and dispersing elements 70 arranged on the lower and/or upper surface of a lightguide 88 which is similar to lightguide 32 in all respects except that such elements 70 are used in place of the aforementioned molded geometries. Such light reflective and dispersing elements and their positioning thereon are discussed in greater detail in co-pending U.S. application Ser. No. 09/002,612 assigned to the present assignee and incorporated by reference as if fully set forth herein. Generally speaking, however, such elements 70 are preferably spots or areas of white reflective paint or ink which are also arranged to selectively eject internally reflected light from the lower surface of lightguide 88 towards the dial. An example of such elements 70 are illustrated in FIG. 8. It should be understood that FIG. 8 is an enlarged section of a lightguide and is shown larger for illustrative purposes only. Moreover, while elements are shown on both the upper and lower surfaces of lightguide 88, elements on both sides need not be included. The patterning thereof should now be understood by way of the disclosure in co-pending application Ser. No. 09/002,612 and by way of the foregoing with respect to the molded geometries.

By utilizing the present invention, and in particular an illumination arrangement and watch incorporating same, that efficiently directs and distributes light so as to uniformly illuminate a watch dial, a compact and economical illumination arrangement for a watch can be achieved. It should also be understood that the term "watch" should be broadly interpreted to include any device capable of providing time functions, such as a pager watch or the like.

Lastly, it should be understood that any other desired illumination pattern is achievable by the selective placement of the foregoing disclosed molded geometries or elements 70. Such variations of illumination patterns can be achieved, for example, by the ejection pattern arrangements set forth in the aforementioned co-pending application Ser. No. 09/002,612. Similarly the molded geometries disclosed herein could likewise be selectively patterned to achieve varied illumination patterns.

Still further, it should be understood that references to watches or dials should also be understood to include such dials of devices as pocketwatches and stopwatches. Moreover, the present invention is equally applicable in connection with other devices that require a lightguide. For example, the lightguide disclosed herein is applicable for use in connection with clocks and other similar devices. Similarly, the claimed illumination arrangement as disclosed herein in connection with a dial is equally applicable in connection with devices, such as stopwatches, clocks and pocketwatches that require a dial as disclosed herein.

It is also to be understood that the following claims are intended to cover all of the generic and specific features of the invention described herein and all statements of the scope of the invention which as a matter of language might fall therebetween.

What we claim is:

1. A lightguide for illuminating a dial, the dial to be illuminated comprising a light transmissive member and disposed above the lightguide, the lightguide comprising:

an at least essentially flat portion having a bottom surface and an upper surface in facing alignment with the dial;

a lightpipe integrally formed with and extending below the flat portion, the lightpipe having a longitudinal axis that is essentially orthogonal to the plane of the flat portion, the lightpipe having at least one foot region at one end thereof; and geometries molded into the bottom surface of the flat portion to selectively eject internally reflected light from the bottom surface of the flat portion through the upper surface;

whereby the lightguide provides illumination to the dial when a concentrated light source disposed below the foot region conducts light to the lightpipe;

wherein a cavity is formed by the lightpipe extending below the flat portion, and including a conical light deflector disposed in the cavity.

2. The lightguide as claimed in claim 1, wherein the lightpipe is tapered such that the width of the cavity is greater than the width of the foot region.

3. An illumination arrangement for a dial of a timekeeping device, the illumination arrangement comprising:

a lightguide having a first portion with a bottom surface and an upper surface in facing alignment with the dial, a lightpipe integrally formed with and extending below the bottom surface, the lightpipe having at least one foot region at one end of the lightpipe, and geometries molded into the bottom surface of the first portion to selectively eject internally reflected light from the bottom surface of the first portion through the upper surface;

the dial to be illuminated disposed above the lightguide, the dial comprising a light transmissive member having a periphery substantially coextensive with that of the lightguide and having a bottom surface in facing alignment with the upper surface of the lightguide; and a concentrated light source disposed below and spaced apart from the at least one foot region of the lightguide;

wherein the lightguide provides at least essentially uniform illumination to the dial when the concentrated light source conducts light to the lightpipe; and wherein the dial includes an absorption pattern on the bottom surface thereof, the absorption pattern for reducing the visible intensity of light emanating from the concentrated light source.

4. The illumination arrangement as claimed in claim 3 wherein a cavity is formed in said lightguide, and including a conical light deflector disposed in the cavity.

5. The illumination arrangement as claimed in claim 3 wherein the absorption pattern is formed of paint with low transmissibility.

6. An illumination arrangement for a dial of a timekeeping device, the illumination arrangement comprising:

a lightguide having a first portion with a bottom surface and an upper surface in facing alignment with the dial, a lightpipe integrally formed with and extending below the bottom surface, the lightpipe having at least one foot region at one end of the lightpipe, and geometries molded into the bottom surface of the first portion to selectively eject internally reflected light from the bottom surface of the first portion through the upper surface;

the dial to be illuminated disposed above the lightguide, the dial comprising a light transmissive member having a periphery substantially coextensive with that of the lightguide and having a bottom surface in facing alignment with the upper surface of the lightguide;

a layer consisting of paper disposed in facing alignment with the bottom surface of the lightguide; and a concentrated light source disposed below and spaced apart from the at least one foot region of the lightguide; and wherein the lightguide provides at least essentially uniform illumination to the dial when the concentrated light source conducts light to the lightpipe.

7. An illumination arrangement for a dial of a timekeeping device, the illumination arrangement comprising:

a lightguide having a first portion with a bottom surface and an upper surface in facing alignment with the dial, a lightpipe integrally formed with and extending below the bottom surface, the lightpipe having at least one foot region at one end of the lightpipe, and geometries molded into the bottom surface of the first portion to selectively eject internally reflected light from the bottom surface of the first portion through the upper surface;

the dial to be illuminated disposed above the lightguide, the dial comprising a light transmissive member having a periphery substantially coextensive with that of the lightguide and having a bottom surface in facing alignment with the upper surface of the lightguide; and a concentrated light source disposed below and spaced apart from the at least one foot region of the lightguide;

wherein the lightguide includes outer edges around the periphery having paint thereon for reducing the amount of light exiting the outer edges of the lightguide thereby causing more light to exit the upper surface of the lightguide.

8. An illumination arrangement as claimed in claim 7, wherein the paint layer is achieved by pitting the outer edges of the lightguide.

* * * * *